US012060107B2

(12) United States Patent
Gordon

(10) Patent No.: US 12,060,107 B2
(45) Date of Patent: Aug. 13, 2024

(54) A-PILLAR SUPPORTS

(71) Applicant: Robby Gordon, Charlotte, NC (US)

(72) Inventor: Robby Gordon, Charlotte, NC (US)

( * ) Notice: Subject to any disclaimer, the term of this patent is extended or adjusted under 35 U.S.C. 154(b) by 0 days.

(21) Appl. No.: 17/694,259

(22) Filed: Mar. 14, 2022

(65) Prior Publication Data

US 2022/0289299 A1 Sep. 15, 2022

Related U.S. Application Data

(60) Provisional application No. 63/161,342, filed on Mar. 15, 2021.

(51) Int. Cl.
*B62D 21/18* (2006.01)
*B62D 23/00* (2006.01)

(52) U.S. Cl.
CPC .......... *B62D 21/18* (2013.01); *B62D 23/005* (2013.01)

(58) Field of Classification Search
CPC .... B62D 21/18; B62D 23/005; B62D 21/183; B60Y 2200/20; B60R 21/13
See application file for complete search history.

(56) References Cited

U.S. PATENT DOCUMENTS

| 9,150,182 | B1* | 10/2015 | Schlangen | B60K 17/34 |
| 10,486,748 | B2* | 11/2019 | Deckard | B62D 25/20 |
| 11,028,883 | B2* | 6/2021 | Olason | F16D 3/223 |
| 2002/0011374 | A1* | 1/2002 | Brister | B62D 21/183 |
| | | | | 180/312 |
| 2014/0117653 | A1* | 5/2014 | Deschambault | B60R 21/13 |
| | | | | 296/100.18 |
| 2014/0124279 | A1* | 5/2014 | Schlangen | B62D 3/02 |
| | | | | 180/311 |
| 2015/0375803 | A1* | 12/2015 | Raska | B62D 23/005 |
| | | | | 280/639 |
| 2018/0072349 | A1* | 3/2018 | Hisada | B62D 23/005 |
| 2018/0281861 | A1* | 10/2018 | Gordon | B62D 21/12 |
| 2019/0375461 | A1* | 12/2019 | Kirtland | B62D 21/03 |

(Continued)

FOREIGN PATENT DOCUMENTS

| GB | 2306408 A * | 5/1997 | B60R 21/13 |
| WO | WO-2017023726 A1 * | 2/2017 | B60G 3/20 |

(Continued)

*Primary Examiner* — Amy R Weisberg
*Assistant Examiner* — Tiffany L Webb
(74) *Attorney, Agent, or Firm* — Barry Choobin; Patent 360

(57) ABSTRACT

An apparatus and methods are provided for a chassis for an off-road vehicle that includes A-pillar supports. The chassis is a welded-tube variety of chassis that includes a front portion and a rear portion that are joined to an intervening passenger cabin portion. A front canopy is coupled to the front portion and reinforces the chassis during loading forces due to front struts. Each of the A-pillar supports includes a vertical brace disposed between the front canopy and a side brace of the vehicle. The vertical brace extends downward from the front canopy, adjacently to an A-pillar and a hinge pillar, to the side brace. The frontward stay extends forward from substantially a midpoint of the vertical brace to a joining of the A-pillar and the hinge pillar. The A-pillar supports reinforce the front canopy and provide structural integrity to a front of the passenger cabin portion.

5 Claims, 4 Drawing Sheets

(56) References Cited

U.S. PATENT DOCUMENTS

2020/0017153 A1\* 1/2020 Barkey .................. B62D 21/12
2021/0094627 A1\* 4/2021 Clark ................... B60N 2/0717
2021/0252932 A1\* 8/2021 Morgan .............. B60W 50/082

FOREIGN PATENT DOCUMENTS

WO    WO-2018025099 A1 \* 2/2018 ............... B60K 5/00
WO    WO-2018118508 A2 \* 6/2018 ............... B60G 3/02

\* cited by examiner

A-PILLAR SUPPORTS

PRIORITY

This application claims the benefit of and priority to U.S. Provisional Application, entitled "A-Pillar Supports," filed on Mar. 15, 2021, and having application Ser. No. 63/161,342, the entirety of said application being incorporated herein by reference.

FIELD

Embodiments of the present disclosure generally relate to the field of vehicle chassis systems. More specifically, embodiments of the disclosure relate to an apparatus and methods for an off-road vehicle chassis comprising A-pillar supports configured to improve the strength of the chassis.

BACKGROUND

Off-road vehicles enjoy an enthusiastic following because of their many uses and versatility. As a result, several types of motorsports involve racing of various types of off-road vehicles. For example, competitions exist that are dedicated to various types of terrain, such as rally, desert racing, and rock-crawling. Besides their use in various motorsports, off-road vehicles commonly are used for sight-seeing and traveling to areas that may not be accessed by way of standard, paved roads.

The use of higher clearance, higher traction vehicles enables off-road vehicles to access trails and roads having rough, low traction surfaces that may not be traversed using a standard, on-road vehicle. As such, off-road vehicles typically comprise larger wheels, wider tires, and suspension configurations that are specifically engineered for use in off-road applications. As a consequence of such suspension configurations, as well as the rough terrain typically traversed, driver and passenger safety is a crucial concern. For example, drivers and passengers typically must be wear safety restraints during off-road travel. A wide variety of different types of safety harnesses are available for use with off-road vehicles.

Unlike on-road vehicles, such as passenger cars, off-road vehicles typically are open, often lacking windows, doors, and body panels common to passenger cars. A chassis comprising a structural arrangement of welded tubes typically is configured to support components of the off-road vehicle. For example, a front portion of the chassis is configured to support a front suspension of the off-road vehicle and various components of the off-road vehicle, such as a steering gear, a front differential, and the like. A rear portion of the chassis is configured to support a rear suspension of the off-road vehicle, such as rear trailing arms, as well as support various drivetrain components, such as a transaxle, a rear differential, an engine, and the like. Further, a roll cage or canopy comprising a welded tube structure coupled to the chassis is configured to protect the driver and passengers in the event of a rollover situation.

Given that off-road vehicles routinely travel over very rough terrain, such as mountainous regions, and are prone to tipping over, there is a desire to improve the mechanical strength, safety, convenience, and comfort of off-road vehicles, while at the same improving the performance of such vehicles.

SUMMARY

An apparatus and methods are provided for a chassis for an off-road vehicle that includes A-pillar supports. The chassis is a welded-tube variety of chassis that includes a front portion and a rear portion that are joined to an intervening passenger cabin portion. A front canopy is coupled to the front portion and reinforces the chassis during loading forces due to front struts. Each of the A-pillar supports includes a vertical brace disposed between the front canopy and a side brace of the vehicle. The vertical brace extends downward from the front canopy, adjacently to an A-pillar and a hinge pillar, to the side brace. The frontward stay extends forward from substantially a midpoint of the vertical brace to a joining of the A-pillar and the hinge pillar. The A-pillar supports are configured to reinforce the front canopy and provide structural integrity to a front of the passenger cabin portion.

In an exemplary embodiment, a support for reinforcing a front canopy of a vehicle comprises: a vertical brace disposed between the front canopy and a side brace of the vehicle; and a frontward stay disposed between the vertical brace and an A-pillar of the front canopy.

In another exemplary embodiment, the vertical brace extends downward from the front canopy, adjacently to the A-pillar and a hinge pillar, to the side brace. In another exemplary embodiment, the vertical brace and the frontward stay are configured to provide structural integrity to a front of a passenger portion of the vehicle. In another exemplary embodiment, a top end of the vertical brace joins all of the A-pillar, a windshield crossmember, and a roof bar at the top of the A-pillar. In another exemplary embodiment, a bottom of the vertical brace joins the bottom of a hinge pillar at a front-most portion of the side brace. In another exemplary embodiment, the frontward stay joins substantially a midpoint of the vertical brace and extends forward to the A-pillar and a hinge pillar. In another exemplary embodiment, the frontward stay is joined to all of a front hoop, a dash bar, a hinge pillar, and the A-pillar.

In an exemplary embodiment, a method for reinforcing a front canopy of a vehicle comprises: disposing a vertical brace between the front canopy and a side brace of the vehicle; and disposing a frontward stay between the vertical brace and an A-pillar of the front canopy.

In another exemplary embodiment, the method further comprises configuring the vertical brace and the frontward stray to provide structural integrity to a front passenger portion of the vehicle. In another exemplary embodiment, disposing the vertical brace includes extending the vertical brace downward from the front canopy, adjacently to the A-pillar and a hinge pillar, to the side brace. In another exemplary embodiment, extending the vertical brace includes joining a top end of the vertical brace with any one or more of the A-pillar, a windshield crossmember, and a roof bar at the top of the A-pillar. In another exemplary embodiment, joining includes welding the top end of the vertical brace to any one or more of the A-pillar, the windshield crossmember, and the roof bar. In another exemplary embodiment, extending the vertical brace includes joining a bottom of the vertical brace with a bottom of the hinge pillar at a front-most portion of the side brace. In another exemplary embodiment, joining includes welding the bottom of the vertical brace to the bottom of the hinge pillar.

In another exemplary embodiment, disposing the frontward stay includes joining the frontward stay with substantially a midpoint of the vertical brace and extending the frontward stay forward to one or more of the A-pillar and a hinge pillar. In another exemplary embodiment, joining the frontward stay includes welding the frontward stay to substantially the midpoint of the vertical brace. In another exemplary embodiment, extending the frontward stay forward includes joining the frontward stay to any one or more of a front hoop, a dash bar, the hinge pillar, and the A-pillar. In another exemplary embodiment, joining the frontward stay includes welding the frontward stay to any one or more of the front hoop, the dash bar, the hinge pillar, and the A-pillar.

These and other features of the concepts provided herein may be better understood with reference to the drawings, description, and appended claims.

BRIEF DESCRIPTION OF THE DRAWINGS

The drawings refer to embodiments of the present disclosure in which.

Figure 1:
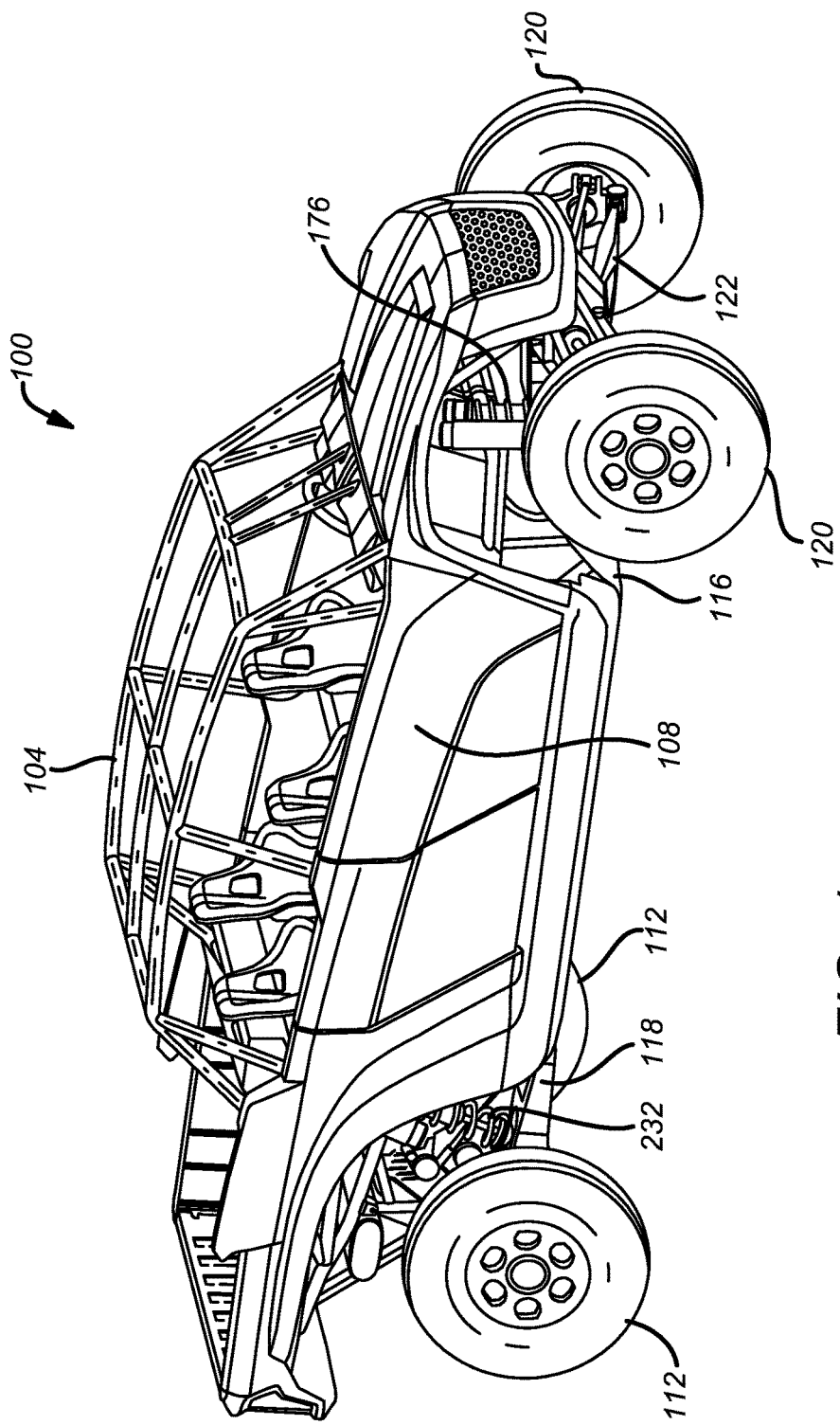
FIG. 1 illustrates an exemplary embodiment of an off-road vehicle that is configured to seat up to four occupants and is suitable for implementation of A-pillar supports in accordance with the present disclosure.

While the present disclosure is subject to various modifications and alternative forms, specific embodiments thereof have been shown by way of example in the drawings and will herein be described in detail. The present disclosure should be understood to not be limited to the particular forms disclosed, but on the contrary, the intention is to cover all modifications, equivalents, and alternatives falling within the spirit and scope of the present disclosure.

DETAILED DESCRIPTION

In the following description, numerous specific details are set forth in order to provide a thorough understanding of the present disclosure. It will be apparent, however, to one of ordinary skill in the art that the A-pillar supports and methods disclosed herein may be practiced without these specific details. In other instances, specific numeric references such as "first tube," may be made. However, the specific numeric reference should not be interpreted as a literal sequential order but rather interpreted that the "first tube" is different than a "second tube." Thus, the specific details set forth are merely exemplary. The specific details may be varied from and still be contemplated to be within the spirit and scope of the present disclosure. The term "coupled" is defined as meaning connected either directly to the component or indirectly to the component through another component. Further, as used herein, the terms "about," "approximately," or "substantially" for any numerical values or ranges indicate a suitable dimensional tolerance that allows the part or collection of components to function for its intended purpose as described herein.

Off-road vehicles typically comprise larger wheels, wider tires, and suspension configurations that are specifically engineered for use in off-road applications. As a consequence of such suspension configurations, as well as the rough terrain typically traversed, driver and passenger safety is a crucial concern. Given that off-road vehicles routinely travel over very rough terrain, such as mountainous regions, and are prone to tipping over, there is a desire to improve the mechanical strength, safety, convenience, and comfort of off-road vehicles, while at the same improving the performance of such vehicles. Embodiments disclosed herein provide an apparatus and methods for an off-road vehicle chassis comprising A-pillar supports that are configured to improve the strength of the chassis.

FIG. 1 shows an off-road vehicle 100 that is particularly suitable for implementation of A-pillar supports in accordance with the present disclosure. As disclosed hereinabove, the off-road vehicle 100 generally is of a Utility Task Vehicle (UTV) variety that seats up to four occupants, includes a roll-over protection system 104, and may have a cab enclosure 108. Rear wheels 112 of the off-road vehicle 100 may be operably coupled with a chassis 116 by way of a trailing arm suspension system 118. Front wheels 120 may be operably coupled with the chassis 116 by way of a front suspension system 122. It should be understood, however, that the A-pillar supports disclosed herein are not to be limited to the specific off-road vehicle 100 shown in FIG. 1, but rather the A-pillar supports may be incorporated into a wide variety of vehicles, other than the off-road vehicle 100 of FIG. 1, without limitation.

Figure 2:
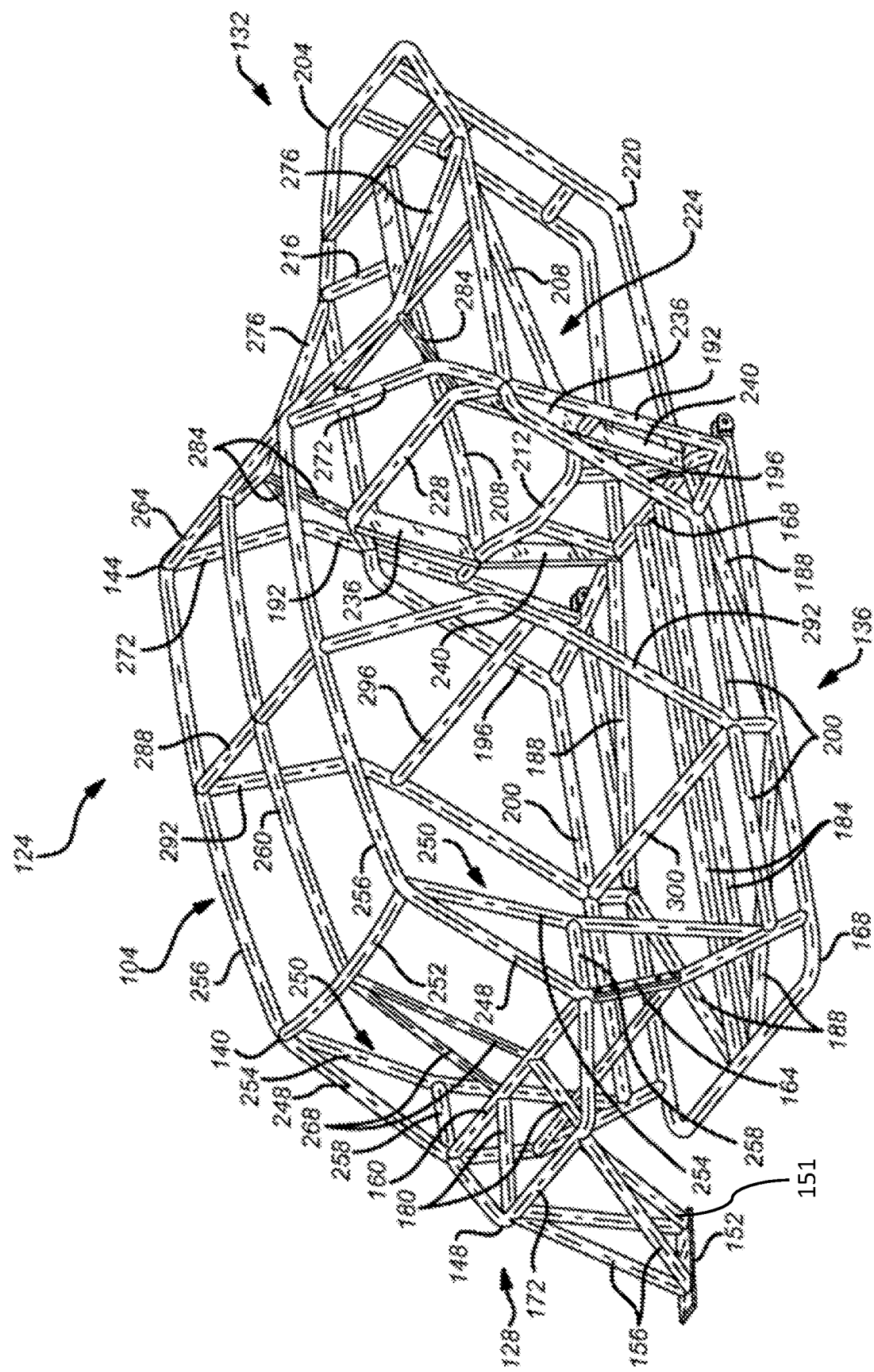
FIG. 2 illustrates an isometric view of an exemplary embodiment of vehicle chassis that includes A-pillar supports according to the present disclosure.

FIG. 2 illustrates an isometric view of an exemplary embodiment of vehicle chassis that includes a roll cage chassis 124 (hereinafter, "chassis 124") that is suitable for implementation in the off-road vehicle 100 of FIG. 1. The chassis 124 generally is a welded-tube variety of chassis that includes a front portion 128 and a rear portion 132 that are joined to an intervening passenger cabin portion 136. The passenger cabin portion 136 shown in FIG. 2 is configured to seat up to four occupants. A front canopy 140 and a rear canopy 144 are configured to impart structural integrity to the chassis 124 and to provide overhead protection to occupants of the off-road vehicle 100, as described herein.

The front portion 128 generally is configured to support various components comprising the off-road vehicle 100, such as, by way of non-limiting example, a front suspension 122, a steering gear, a front differential, and the like. The front portion 128 may be defined by a front hoop 148 at a top of the front portion 128 and a bulkhead mount 152 at a bottom of the front portion 128. A front forward stay 156 and a rear forward stay 151 attach the front hoop 148 to the bulkhead mount 152. The bulkhead mount 152 is configured to be attached to a front structural bulkhead (not shown) that supports at least the front suspension 122, a steering gear, a front differential, and the like. In some embodiments, the bulkhead mount 152 may be attached to a modular front drivetrain that supports an entire front drivetrain and suspension assembly. In such applications, the modular front drivetrain advantageously enables the entire drivetrain and suspension assembly to be quickly and easily replaced in the event of a part failure, unlike in the case of conventional off-road vehicles that may be sidelined during a race due to the failure of an individual part comprising the drivetrain or the suspension. The front forward stay 156 and the rear forward stay 151 operates to couple the modular front drivetrain to the chassis 124. Opposite of the front forward stay 156 and the rear forward stay 151, the front hoop 148 is joined to opposite ends of a dash bar 160 and hinge pillars 164 comprising the passenger cabin portion 136.

Figure 4:
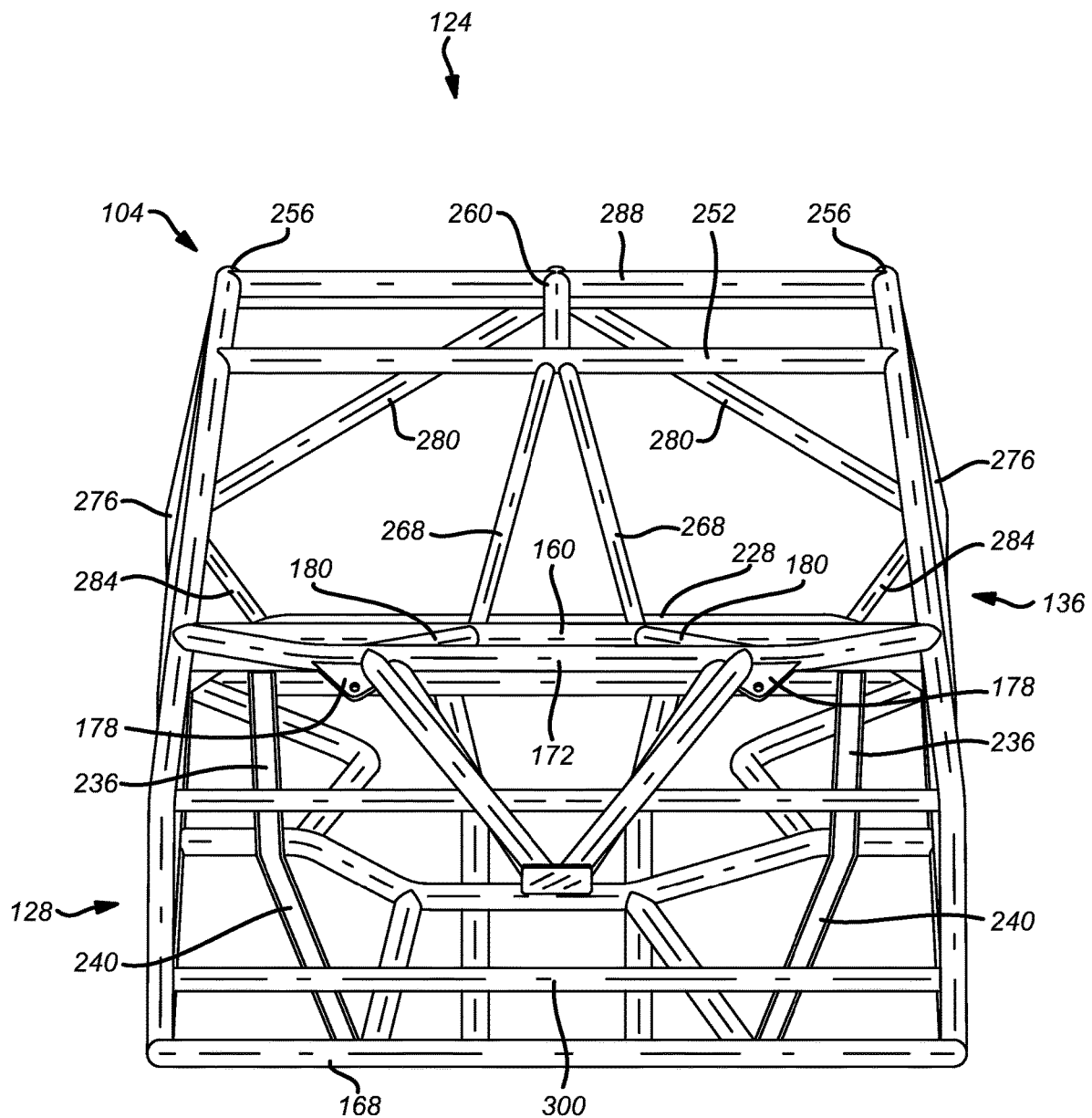
FIG. 4 illustrates a front view of the vehicle chassis of FIG. 3, showing a triangular structure comprising the vehicle chassis, in accordance with the present disclosure.

With continuing reference to FIG. 2, a front strut crossmember 172 comprises a portion of the front hoop 148 between the driver-side and passenger-side of the front hoop 148. The front strut crossmember 172 provides a means for coupling front struts 176 to the chassis 124, as described herein. As shown in FIG. 2, front strut braces 180 are disposed between the front strut crossmember 172 and the dash bar 160. The front strut braces 180 are configured to reinforce the front strut crossmember 172, such that loading on the front strut crossmember 172 by the front struts 176 is distributed to the dash bar 160. As shown in FIG. 4, one end of each front strut brace 180 is coupled to a location of a front strut crossmember 172 that is above a top mount 178 of a front strut 176 (see FIG. 1). As such, forces on the front strut crossmember 172 by the front struts 176, during operation of the vehicle 100, are shared by the dash bar 160.

With continuing reference to FIG. 2, the floor hoop 168 generally defines a floor of the passenger cabin portion 136. Longitudinal floor bars 184 and crossmembers 188 coupled with the floor hoop 168 impart structural strength to the passenger cabin portion 136 and facilitate coupling various components to the floor of the passenger cabin portion 136. The hinge pillars 164 join the front portion 128 with the floor hoop 168, and thus define a front of the passenger cabin portion 136. Rear pillars 192 are coupled with a rear of the passenger cabin portion 136 and join the passenger cabin portion 136 with the rear portion 132 of the chassis 124. A rear side brace 196 is disposed between each rear pillar 192 and the floor hoop 168. Similarly, a side brace 200 is disposed along each side of the passenger cabin portion 136 parallel to the floor hoop 168. The side braces 200 each extend from the hinge pillar 164 to the rear side brace 196. It is contemplated that the side braces 196, 200 generally resist bowing of the passenger cabin portion 136 due to loading on the front and rear portions 128, 132 during operation of the vehicle 100.

The rear portion 132 generally is configured to support a rear suspension 118 of the off-road vehicle 100, such as rear trailing arms, as well as support various drivetrain components, shown in FIG. 1, such as a transaxle, a rear differential, an engine, and the like. A rear hoop 204 is joined at opposite ends to rear pillars 192 and defines an upper extent of the rear portion 132. Below the rear hoop 204 are lower rear stays 208 that are coupled with the rear pillars 192 by way of a seat crossmember 212. Braces 216 couple the lower rear stays 208 to the rear hoop 204. The rear hoop 204, the lower rear stays 208 and the braces 216 comprise a structure suitable for mounting drivetrain components, such as a transaxle, a rear differential, an engine, and the like. A rear skid plate 220 is disposed at a bottom of the rear portion 132 and coupled between the passenger cabin portion 136 and a rear-most portion of the rear hoop 132. The rear skid plate 220 serves to provide protection to an underside of the drivetrain components during operation of the vehicle 100. As such, the rear hoop 204, the lower rear stays 208 and the rear skid plate 220 generally define an engine bay 224 of the vehicle 100.

As shown in FIG. 2, a rear strut crossmember 228 is disposed between the rear pillars 192 and joined with the ends of the rear hoop 204. The rear strut crossmember 228 is configured to provide a means for coupling rear struts 232 (see FIG. 1) to the chassis 124. As shown in FIG. 2, vertical braces 236 are disposed between the rear strut crossmember 228 and the seat crossmember 212. The vertical braces 236 are configured to reinforce the rear strut crossmember 228, such that loading on the rear strut crossmember 228 by the rear struts 232 is distributed to the seat crossmember 212. As such, forces on the rear strut crossmember 228 by the rear struts 232, during operation of the vehicle 100, are shared by the seat crossmember 212. Further, lower braces 240 disposed between the seat crossmember 212 and the floor hoop 168 cause the passenger cabin portion 136 to contribute to distributing loading forces throughout the chassis 124.

As will be appreciated, the passenger cabin portion 136, as well as the front portion 128 and the rear portion 132, are configured to distribute loading forces during operation of the vehicle 100 so as to resist damage to components comprising the vehicle and to protect occupants riding within the vehicle 100. To this end, the canopy 104 is configured to contribute to the structural integrity of the chassis 124. The canopy 104 comprises a front canopy 140 and rear canopy 144 that are configured to be coupled with the chassis 124. In particular, the front canopy 140 is configured to be coupled with the front portion 128, and the rear canopy 144 is configured to be coupled with the rear portion 132. Further, the front canopy 140 is configured to be coupled with the rear canopy 144. The front and rear canopies 140, 144 are respectively fastened to the front and rear portions 128, 132 by way of multiple fasteners (not shown). In general, each fastener comprises a tube-shaped member having a diameter that is substantially similar to the diameter of the frame portions that are coupled together.

It should be recognized that the front canopy 140 and the rear canopy 144 provide an overhead assembly that contributes to the overall integrity of the entire chassis 124. As such, the front canopy 140 and the rear canopy 144 provide an overhead spine to the chassis 124 that greatly increases the strength of the chassis 124 and thus the safety of occupants of the vehicle 100 relative to conventional chassis configurations. The front and rear canopies 140, 144 are discussed in greater detail in the following paragraphs.

The front canopy 140 includes an A-pillar 248 that is coupled with each hinge pillar 164 and extends upward to a windshield crossmember 252. As such, the A-pillars 248 and the windshield crossmember 252 generally define a windshield area of the vehicle 100. Each A-pillar 248 joins with a roof bar 256 that extends rearward to the rear canopy 144. In some embodiments, the A-pillar 248 and the roof bar 256 comprise separate tube-pieces that are fastened or joined together, such as by welding. In some embodiments, however, the A-pillar 248 and the roof bar 256 comprise a single tube-piece that is suitably bent or manipulated to form the A-pillar 248 and the roof bar 256 as shown in FIG. 2. The roof bars 256 may be fastened to the rear canopy 144 by way of suitably sized fasteners.

As shown in FIG. 2, each of the A-pillars 248 is reinforced by an A-pillar support 250, in accordance with the present disclosure. The A-pillar support 250 comprises a vertical brace 254 and a frontward stay 258. The vertical brace 254 generally extends downward from the front canopy 140, adjacent to the A-pillar 248 and the hinge pillar 164, to the side brace 200. As shown in FIG. 2, a top end of the vertical brace 254 may join all of the A-pillar 248, the windshield crossmember 252, and the roof bar 256 at the top of the A-pillar 248. Further, a bottom of the vertical brace 254 may join the bottom of the hinge pillar 164 at a front-most portion of the side brace 200. The frontward stay 258 generally joins a midpoint of the vertical brace 254 and extends forward to the A-pillar 248 and the hinge pillar 164. As shown in FIG. 2, the frontward stay 258 may be joined to all of the front hoop 148, the dash bar 160, the hinge pillar 164, and the A-pillar 248. It is contemplated that the A-pillar supports 250 serves to provide further structural integrity to the front of the passenger portion 136 of the vehicle 100 by preventing the front canopy 140 from collapsing during a rollover event.

With continuing reference to the front canopy 140 of FIG. 2, a center roof bar 260 is disposed substantially midway between the roof bars 256 and extends from the windshield crossmember 252 rearward to a roof crossmember 264 that comprises the rear canopy 144. Forward of the center roof bar 260, windshield braces 268 extend toward the dash bar 160. Each windshield brace 268 may be joined with the dash bar 160 by way of a suitably sized fastener. Further, the windshield braces 268 are joined to locations of the dash bar 160 that generally coincide with the front strut braces 180. As shown in FIG. 4, each front strut brace 180 is coupled to a location of the front strut crossmember 172 that is above a top mount 178 of a front strut 176 (see FIG. 1). It is contemplated that loading forces due to the front struts 176, shown in FIG. 1, are distributed along the front strut braces 180, the windshield braces 268, and the center roof bar 260 to the rear canopy 144. It should be understood, therefore, that the front strut braces 180, the windshield braces 268, the center roof bar 260 and the rear canopy 144 comprise an overhead spine that serves to reinforce the structural integrity of the chassis 124.

Figure 3:
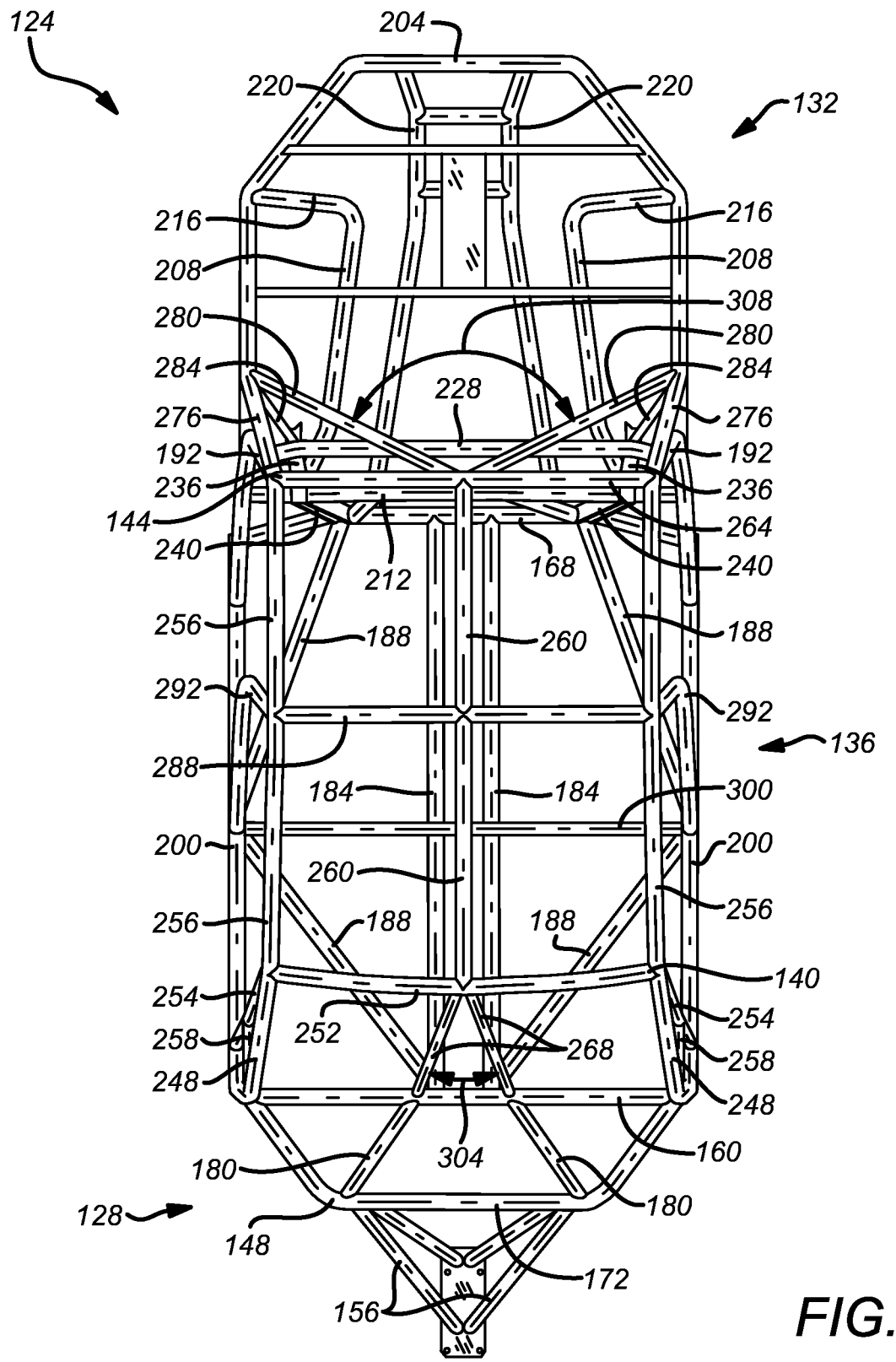
FIG. 3 illustrates a top plan view of the vehicle chassis of FIG. 2, in accordance with the present disclosure.

As shown in FIG. 2, the center roof bar 260 and both roof bars 256 are joined to the roof crossmember 264 at the rear canopy 144. The roof crossmember 264 is disposed between C-pillars 272 that are fastened to the rear pillars 192 comprising the passenger cabin portion 136, as described herein. A rear brace 276 extends rearward of each C-pillar 272 from the roof crossmember 264 to the rear hoop 204. A suitably sized fastener may couple each rear brace 276 to the rear hoop 204. As such, the roof bars 256 are reinforced by the passenger cabin portion 136 by way of the rear pillars 192 and the C-pillars 272, as well as the rear portion 132 of the chassis 124 by way of the rear braces 276. Further, as best shown in FIGS. 3-4, the center roof bar 260 is reinforced by roof braces 280 extending from the roof crossmember 264 to the rear braces 276 and by angled braces 284 extending from each rear brace 276 to the rear strut crossmember 228. To this end, the roof braces 280 are joined with the roof crossmember 264 at a location directly rearward of the center roof bar 260. Thus, forces acting on the center roof bar 260 are distributed to the rear braces 276 by way of the roof crossmember 264 and the roof braces 280.

Turning, again, to FIG. 2, the chassis 124 generally is adapted for use in an off-road vehicle configured to carry up to four occupants, as described herein. As such, a central roof crossmember 288 is disposed substantially midway along the roof bars 256 to provide further structure between the front canopy 140 and the rear canopy 144. Further, the center roof bar 260 extends from the windshield crossmember 252 rearward to the center roof crossmember 288 before continuing rearward from the center roof crossmember 288 to the roof crossmember 264. The center roof crossmember 288 is reinforced by B-pillars 292 joined to opposite ends of the center roof crossmember 288. The B-pillars 292 extend generally downward from the roof bars 256 to a seat cross member 296 and then extends to side braces 200 and the floor hoop 168. The seat crossmember 296 is disposed between the B-pillars 292 and generally delineates a separation between front seating and rear seating within the passenger cabin portion 136. Further, a crossmember 300 joins the B-pillars 292 and the side braces 200. As will be appreciated, the crossmember 300 serves to reinforce a middle section of the passenger cabin portion 136.

FIG. 3 illustrates a top view of an exemplary embodiment of a vehicle chassis 124 of an off-road vehicle 100. As discussed hereinabove, the front canopy 140 includes an A-pillar 248 disposed along a driver-side and a passenger-side of the windshield area. The A-pillars 248 extend upward to a windshield crossmember 252. Each A-pillar 248 joins with a roof bar 256 that extends rearward to the rear canopy 144. A center roof bar 260 is disposed substantially midway between the roof bars 256 and extends from the windshield crossmember 252 rearward to a roof crossmember 264 comprising the rear canopy 144. Forward of the center roof bar 260, windshield braces 268 extend through the windshield area toward the dash bar 160. As discussed herein, the windshield braces 268 are joined to locations of the dash bar 160 that coincide with the front strut braces 180, such that the windshield braces 268 participate in distributing loading forces due to the front struts 176 (see FIG. 1) to the rear canopy 144.

Moreover, the windshield braces 268 spread apart from one another at an angle 304 as they extend through the windshield area to the dash bar 160. The angle 304 between the windshield braces 268 positions the windshield braces 268 at an angle with respect to the A-pillars 248, as well. Experimental observation has demonstrated that the windshield braces 268 disposed at the angle 304 provides a roll cage lateral support to the front canopy 140 that operates to reinforce the front canopy 140 from collapsing during a rollover event. In particular, the windshield braces 268 disposed at the angle 304 effectively counteracts lateral forces that may be exerted on the front canopy 140, thereby preventing the A-pillars 248 from being folded over and injuring occupants within the passenger cabin portion 136 of the vehicle 100. In general, the angle 304 between the windshield braces 268 is dictated by the locations along the dash bar 160 that are joined by the front strut braces 180. In is contemplated, however, that the windshield braces 268 may be disposed at any of various suitable angles 304 with respect to one another, without limitation.

With continuing reference to FIG. 3, the front canopy 140 and the rear canopy 144 generally provide an overhead assembly that contributes to the overall integrity of the entire chassis 124 and thus optimizes the safety of occupants within the vehicle 100. As described herein, the center roof bar 260 extends rearward from the windshield crossmember 252 of the front canopy 140 to the roof crossmember 264 comprising the rear canopy 144. Further, roof bars 256 comprising the front canopy 140 are joined to the roof crossmember 264 comprising the rear canopy 144. The roof crossmember 264 is disposed between C-pillars 272 (see FIG. 2) that are fastened to the rear pillars 192 of the passenger cabin portion 136. A rear brace 276 extends rearward of each C-pillar 272 from the roof crossmember 264 to the rear hoop 204. As such, the roof bars 256 are reinforced by the C-pillars 272 and the rear pillars 192 of the passenger cabin portion 136, as well as by way of the rear braces 276. As further shown in FIG. 3, the center roof bar 260 is reinforced by roof braces 280 extending from the roof crossmember 264 to the rear braces 276. To this end, the roof braces 280 are joined with the roof crossmember 264 at a location directly rearward of the center roof bar 260. Thus, forces acting on the center roof bar 260 are distributed to the rear braces 276 by way of the roof crossmember 264 and the roof braces 280.

As shown in FIG. 3, the roof braces 280 spread apart from one another at an angle 308 as they extend to the rear braces 276 on opposite sides of the rear portion 132. Similar to the windshield braces 268 discussed above, experimental observation has shown that the roof braces 280 disposed at the angle 308 provide a roll cage lateral support that reinforces the rear canopy 144 against collapsing during a rollover event. As will be appreciated, the angle 308 between the roof braces 280 effectively counteracts lateral forces that may be exerted on the rear canopy 144, thereby preventing the C-pillars 272 from folding over and injuring occupants within the vehicle 100 during rolling over. It is contemplated that the roof braces 280 may be disposed at any of various suitable angles 308 that are found to optimize the structural integrity of the rear canopy 144, without limitation.

While the A-pillar supports and methods have been described in terms of particular variations and illustrative figures, those of ordinary skill in the art will recognize that the A-pillar supports are not limited to the variations or figures described. In addition, where methods and steps described above indicate certain events occurring in certain order, those of ordinary skill in the art will recognize that the ordering of certain steps may be modified and that such modifications are in accordance with the variations of the A-pillar supports. Additionally, certain of the steps may be performed concurrently in a parallel process, when possible, as well as performed sequentially as described above. To the extent there are variations of the A-pillar supports, which are within the spirit of the disclosure or equivalent to the A-pillar supports found in the claims, it is the intent that this patent will cover those variations as well. Therefore, the present disclosure is to be understood as not limited by the specific embodiments described herein, but only by scope of the appended claims.

What is claimed is:

1. A support for reinforcing a front canopy of a vehicle, comprising:
    a vertical brace having a proximal end and a distal end, the vertical brace extends between the front canopy and a side brace of the vehicle;
    a frontward stay having a proximal end and a distal end;
    an A-pillar having a proximal end and a distal end; and
    a hinge pillar having a proximal end and a distal end,
    wherein the proximal end of the vertical brace and the proximal end of the A-pillar are coupled to ends of a windshield crossmember and a roof bar,
    wherein the distal end frontward stay extends from a mid of the vertical brace and the proximal end of the frontward stay is coupled to the distal end of the A-pillar, a front strut crossmember, a dash bar, and the proximal end of the hinge pillar,
    wherein the distal end of the hinge pillar and the distal end of the vertical brace are coupled to the side brace,
    wherein the front strut crossmember and the dash bar forms a front hoop,
    wherein the front hoop extends forward from the dash bar, the front hoop has a proximal end and a distal end,
    wherein the support further comprises:
        a bulkhead mount spatially positioned below and forward to the front hoop, the bulkhead mount is of an elongated rectangular profile having a front-end portion and a rear-end portion;
        a front forward stay of a V-shape profile, the front forward stay extends between the proximal end of the front hoop, the distal end of the front hoop, and the front end portion of the bulkhead mount; and
        a rear forward stay of a V-shape profile, the rear forward stay extends between the proximal end of the front hoop, the distal end of the front hoop, and the rear end portion of the bulkhead mount,
        wherein the bulkhead mount and the front hoop extend perpendicular to each other, wherein the bulkhead mount is only supported by the front forward stay and the rear forward stay.

2. The support of claim 1, wherein the vertical brace extends downward from the front canopy, adjacently to the A-pillar and the hinge pillar, to the side brace.

3. The support of claim 1, wherein the vertical brace and the frontward stay are configured to provide structural integrity to a front of a passenger portion of the vehicle.

4. The support of claim 1, wherein the distal ends of the vertical brace and the hinge pillar are coupled to a front-most portion of the side brace.

5. The support of claim 1, wherein the frontward stay is substantially perpendicular to the vertical brace, wherein the frontward stay, the front strut crossmember, and the dash bar are substantially in a same plane.

* * * * *